No. 831,416. PATENTED SEPT. 18, 1906.
J. CHALMERS.
TRANSMISSION GEAR.
APPLICATION FILED JAN. 4, 1906.
2 SHEETS—SHEET 2.
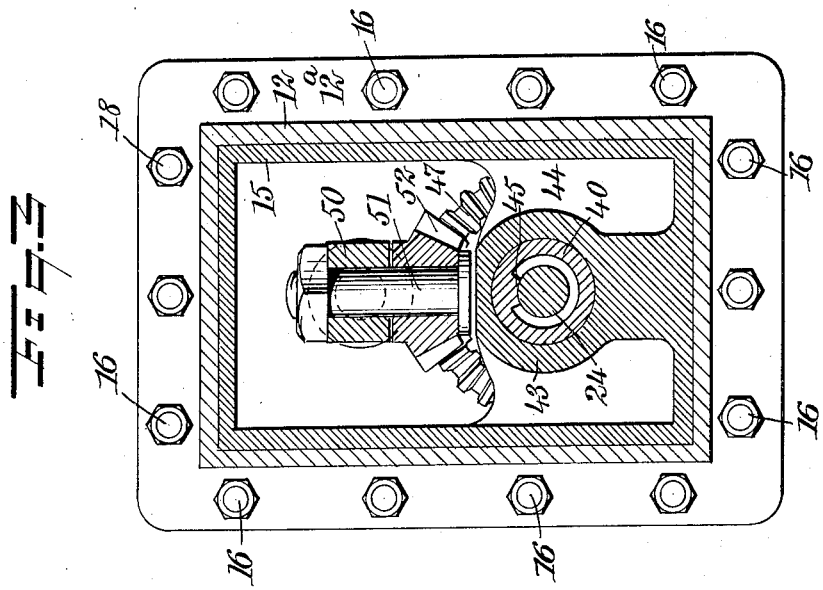
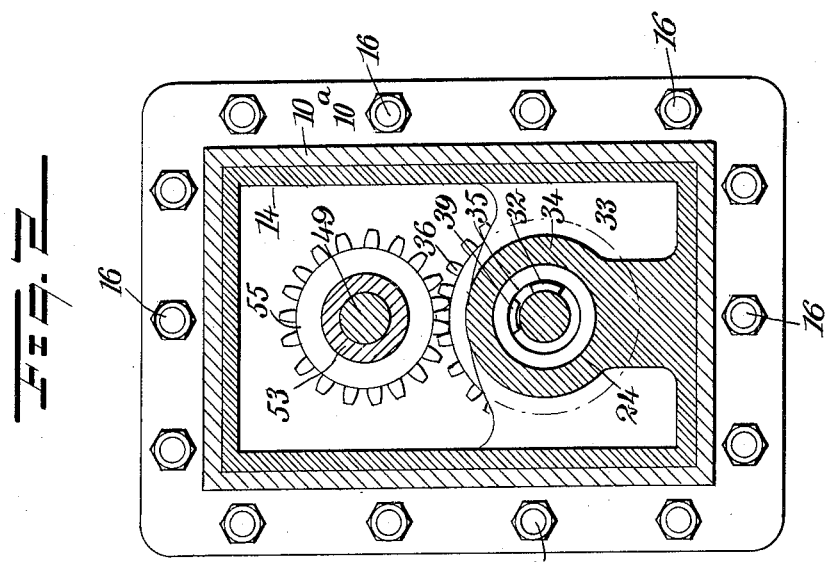
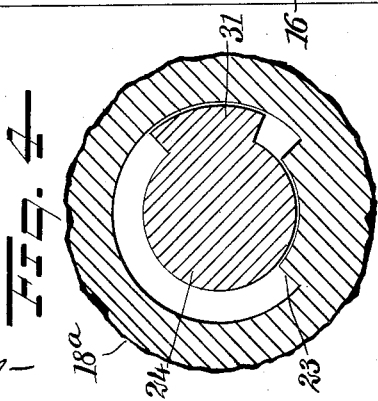
WITNESSES:
John A Bergstrom
Isaac B. Owens
INVENTOR
John Chalmers
BY
Munn & Co.
ATTORNEYS

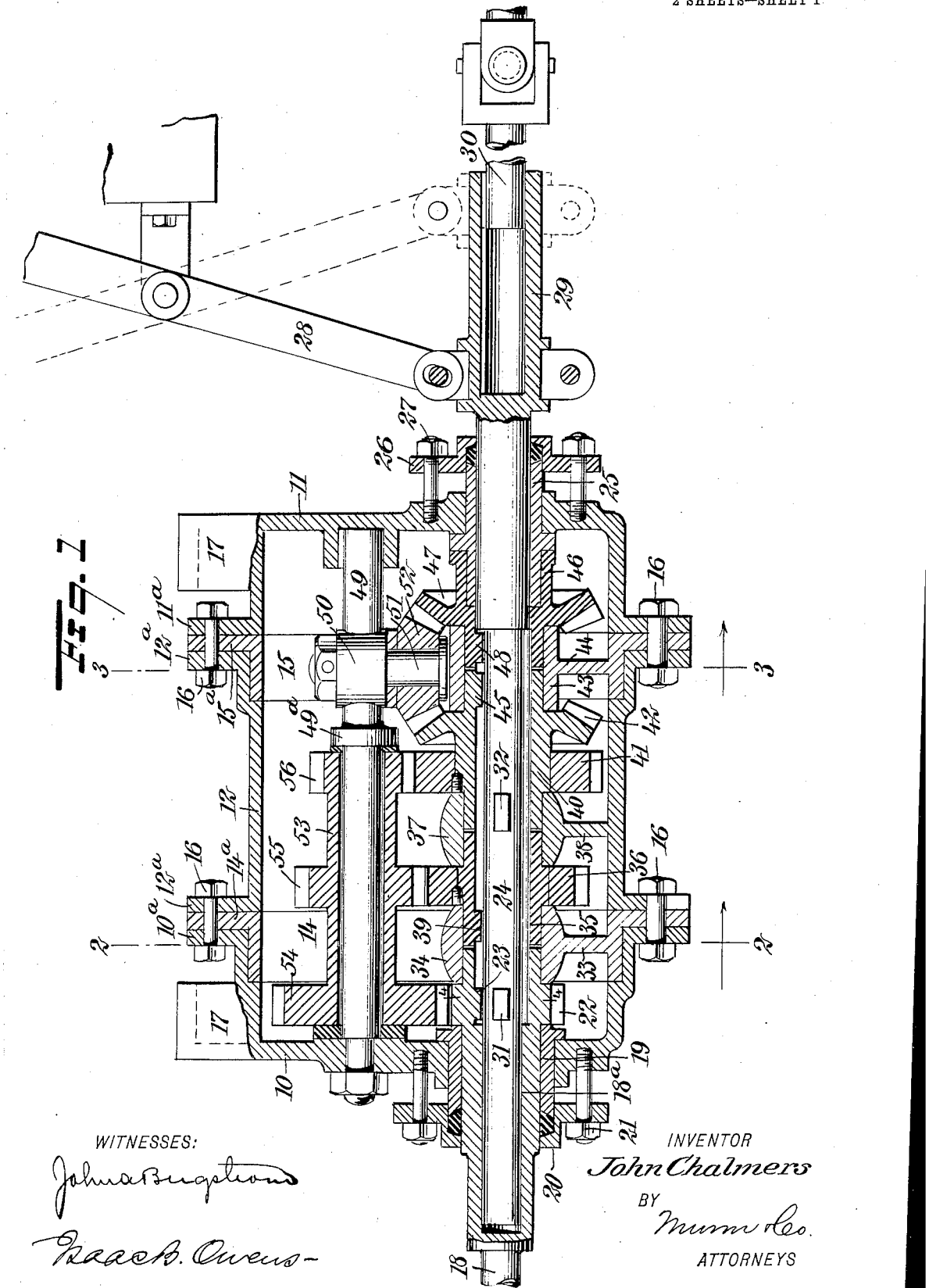

UNITED STATES PATENT OFFICE.

JOHN CHALMERS, OF BATH, MAINE.

TRANSMISSION-GEAR.

No. 831,416.  Specification of Letters Patent.  Patented Sept. 18, 1906.

Application filed January 4, 1906. Serial No. 294,564.

*To all whom it may concern:*

Be it known that I, JOHN CHALMERS, a subject of the King of Great Britain, and a resident of Bath, in the county of Sagadahoc and State of Maine, have invented a new and Improved Transmission-Gear, of which the following is a full, clear, and exact description.

The invention relates to a means for transmitting rotary motion reversely and at various speeds. It is useful in many connections, but particularly in connection with internal-combustion engines employed for driving boats and vehicles.

The invention relates to that class of transmission-gears in which the rotary motion is transmitted at different speeds through two sets of gears running on parallel axes, of which gears some elements are loose and provided with clutch devices for connecting them at will, so that the transmission may be through any one of the gears desired, and consequently at speeds proportionate to the ratio of the gears then transmitting.

The novel features of my invention especially reside in the peculiar construction and organization of the devices for connecting the loose gears at will with the transmitting element coacting therewith, in the arrangement of the reverse transmission, in the general organization of the mechanism within its case, and in various features of major or minor importance, all of which will be fully set forth hereinafter, and particularly pointed out in the claims.

Reference is to be had to the accompanying drawings, which illustrate as an example the preferred embodiment of my invention adapted for transmitting three speeds forward and one reverse, in which drawings—

Figure 1 is a longitudinal sectional view of the gearing and its case. Fig. 2 is a cross-section of the invention on the line 2 2 of Fig. 1. Fig. 3 is a cross-section of the invention on the line 3 3 of Fig. 1, and Fig. 4 is a cross-section on the line 4 4 of Fig. 1.

The gear-case comprises front and rear end sections 10 and 11, and an intermediate section 12, said section having flanges $10^a$, $11^a$, and $12^a$, between which fit the flanges $14^a$ and $15^a$ of the two bearing-frames 14 and 15. As shown in Figs. 2 and 3, the gear-case is rectangular in cross-sectional form, and the bearing-frames 14 and 15 are correspondingly shaped, said frames fitting in the recesses in the sections 10 and 12 and serving the double function of supporting the bearings, as will hereinafter be described, and of bracing and strengthening the gear-case. The various flanges $10^a$, $14^a$, $12^a$, $15^a$, and $11^a$ are firmly fastened together by bolts 16, as shown, and, if desired, the end sections 10 and 11 of the case may be provided with lugs 17, through the medium of which the transmission-gear may be bolted in place. Said lugs 17 or other equivalent devices will of course be located on the case in various positions, according to the installation of the gear.

18 indicates the driving member of the gear, which may be the engine-shaft or a shaft-section coupled or clutched thereto. Said driving element has a tubular portion $18^a$, which is rotatably mounted in a sleeve 19, secured in an orifice in the front end of the gear-case. The sleeve 19 also serves as a gland for the stuffing-box 20, which surrounds the tubular portion $18^a$ of the driving member, and is held in place by stud-bolts 21. Within the case the tubular end $18^a$ of the driving element is formed exteriorly with a pinion 22, and interiorly the tubular member is enlarged and provided with a tongue or key 23. Fitting in the tubular member $18^a$ of the driving element is the front end of a shaft 24, forming the driven element. Said shaft is loose on the shaft 18 and extends longitudinally through the gear-box, its rear portion bearing on a sleeve 25, which is seated in the rear end of the gear-box and serves also as a gland for the stuffing-box 26, similar to the stuffing-box 20, and fastened by bolts 27, as shown. The rear end of the driven member 24 is provided with a lever 28, by which the driven member may be shifted longitudinally or axially, and, if desired, said rear end of the driven member may be tubulated, as indicated at 29, and have splined thereon a shaft 30 for transmitting movement. Within the gear-case the reduced portion of the driven shaft or element 24 is provided with two keys or tongues 31 and 32, respectively, and these are adapted to lock with the key 23 and other similar keys, as will be hereinafter fully set forth.

The bearing-frame is formed in its lower portion with a web 33, which supports a bearing 34, in which is fitted the rear extremity of the driving element 18 and in which is also fitted the front end of the hub 35 of a spur-gear 36. The rear end of this hub is fitted in a bearing 37, which is sustained on the middle section 12 of the gear-case by a web 38.

Said hub 35 is formed interiorly with a key 39, similar in form and function to the key 23 before described. 40 indicates a sleeve which loosely surrounds and is spaced from the shaft 24, and the front end of which is mounted in the bearing 37. This sleeve carries a spur-gear 41 intermediate its ends, and rearward of the spur-gear the sleeve 40 carries a bevel-gear 42. The rear extremity of the sleeve 40 is mounted in a bearing 43, which is sustained on the web 44 of the bearing-frame 15, and said rear extremity of the sleeve 40 is formed interiorly with a tongue or key 45, similar to the keys 23 and 39, previously described. The bearing 43 also mounts the front end of a sleeve 46, which is located at the rear of the web 44 and the rear end of which surrounds and is loosely mounted on the front extremity of the sleeve 25. Said sleeve 46 carries a bevel-gear 47, the teeth of which face forward oppositely to the teeth of the gear 42. The front end of the sleeve 46 is provided interiorly with a key 48, which is similar to keys 23, 39, and 45 before described.

Fastened within the gear-case above and parallel with the shaft 44 is a stationary shaft 49, the rear part of which is provided with a box 50, in which is fastened a stud-shaft 51. The lower end of this shaft loosely mounts an intermediate bevel-gear 52, which meshes with the gears 42 and 47. Forward of the box 50 the stationary supporting-shaft 49 has a collar 49$^a$, and between this collar and the front wall of the gear-case is arranged a sleeve 53. Said sleeve is loose on the shaft and carries three gears 54, 55, and 56. The gear 54 meshes with the gear 22, the gear 55 with the gear 36, and the gear 56 with the gear 41. The gears 22, 36, and 41 progressively increase in diameter, while the gears 54, 55, and 56 progressively decrease in diameter. The gear 22 is fast on the driving-shaft and rotates continuously therewith, thus imparting, through the gear 54, a continuous rotary motion to the sleeve 53 and gears 55 and 56. The gears 36 and 41 are loose and may run idly. The keys 31 and 32 of the driven shaft 24 are adapted to engage various ones of the keys 23, 39, 45, and 48.

Assuming the parts to be in the adjustment shown in Fig. 1 and that the driving element 18 is rotating, the sleeve 53 will, through the gears 22 and 54, be rotated in the opposite direction and at a lower speed. Since the key 31 on the driven shaft 24 is in position to engage the key 23, said driven shaft will be locked directly with the drive-shaft, and the gear transmits at full speed, the other parts of the gear operating idly.

In order to reduce the speed—say, for instance to half the speed of the shaft 18—the lever 28 should be operated to slide the member 24, disengaging the key 31 from the key 23 and engaging it with the key 39. This fastens the gear 36 to the driven shaft 24, and the gear then transmits through the elements 22, 54, 53, 55, and 36 at half the speed of the driving element, owing to the ratio of the elements 22 and 54. To change the adjustment to a low speed, the lever 28 should be further moved so as to run the key 31 out of engagement with the key 39 and engage the key 32 with the key 45, thus locking the sleeve 40 to the key 32, so that the rotating sleeve 53, through the gears 56 and 41 then drives the sleeve 40, and consequently the driven shaft 24. This speed is a still further reduction, owing to the ratio of the gears 54 and 41. During this time the gear 42 rotates the gear 52, but the gear 47 runs idly without transmitting movement. To reverse the direction of rotation, a further movement should be given to the lever 28 and its attached shaft 24, disengaging the gear 32 from the key 45 and engaging it with the key 48. The gear 41 then runs loose on the shaft 24 and by means of the intermediate gear 52 drives the gear 48, and consequently the shaft 24, in reverse direction. In order to return the parts to the ahead adjustment, it is only necessary to reverse the movement of the lever 28, the gear adjustment running from high speed down through intermediate and low speed to reverse and from reverse through low and intermediate speed back to high speed.

Having thus described the preferred form of my invention, what I claim as new, and desire to secure by Letters Patent, is—

1. The combination of driving and driven elements, a gear attached to the driving element, a second gear, connected gears meshed respectively with the two gears first named, a reverse-gear driven from the second-named gear, and means for connecting the driven element with either the reverse-gear or the second-named gear.

2. The combination of axially-alined driving and driven elements, a gear attached to the driving element, a second gear, connected gears meshed respectively with the two gears first named, a reverse-gear driven from the second-named gear, and means for connecting the driven element with either the reverse-gear or the second-named gear.

3. The combination of axially-alined driving and driven elements, a gear attached to the driving element, a second gear, connected gears meshed respectively with the two gears first named, a reverse-gear driven from the second-named gear, means for connecting the driven element with either the reverse-gear or the second-named gear, and means for directly connecting the driving and driven elements.

4. The combination of a drive-shaft, a driven shaft fitted loosely therein, a gear attached to the driving-shaft, a gear loosely surrounding the driven shaft, connected gears respectively meshed with the gears first named, a reverse-gearing driven from the second-named gear, and means for connecting the driven shaft with either the drive-shaft, the second gear or the reverse-gearing.

5. The combination of a drive-shaft, a driven shaft fitted loosely therein, a gear attached to the driving-shaft, a gear loosely surrounding the driving-shaft, connected gears respectively meshed with the gears first named, a reverse-gearing driven from the second-named gear, the driven shaft having keys thereon adapted to connect it with either the drive-shaft, the second gear or the reverse-gear.

6. The combination of a driving element, a driven element, a low-speed gearing driven from the driving element, a bevel-gear also driven from the driving element, an intermediate bevel-gear meshed with the first bevel-gear, a third bevel-gear meshed with the intermediate bevel-gear, and means for connecting the driven element with either the driving element, the low-speed gearing or the third bevel-gear.

7. The combination of a drive-shaft, a driven shaft slidable in one end thereof, a low-speed gearing having an element loosely surrounding the driven shaft, a bevel reverse-gearing having an element loosely surrounding the driven shaft, and means connecting the driven shaft with either the drive-shaft, the said element of the low-speed gearing or the said element of the reverse-gearing.

8. The combination of a drive-shaft, a driven shaft slidable in one end thereof, a low-speed gearing having an element loosely surrounding the driven shaft, a bevel reverse-gearing having an element loosely surrounding the driven shaft, and means connecting the driven shaft with either the drive-shaft, the said element of the low-speed gearing or the said element of the reverse-gearing, said means comprising keys on the driven shaft and coacting keys on the parts to be connected therewith.

9. The combination of alined drive and driven shafts, a low-speed gearing comprising an element loosely surrounding the driven shaft, means for mounting said element independently of the driven shaft, a reverse-gearing comprising an element loosely surrounding the driven shaft, means for mounting said element independently of the driven-shaft, and means for connecting the driven shaft with either of said elements of the low-speed and reverse gears.

10. The combination of alined drive and driven shafts, a low-speed gearing comprising an element loosely surrounding the driven shaft, means for mounting said element independently of the driven shaft, a reverse-gearing comprising an element loosely surrounding the driving-shaft, means for mounting said element independently of the driven shaft, and means for connecting the driven shaft with either of said elements of the low-speed and reverse gears, said means comprising a key on the driven shaft adapted to engage corresponding keys on the low-speed and reverse gear elements.

11. The combination of alined drive and driven shafts, a low-speed gearing comprising an element loosely surrounding the driven shaft, means for mounting said element independently of the driven shaft, a beveled reverse-gearing comprising an element loosely surrounding the driven shaft, means for mounting said element independently of the driven shaft, and means for connecting the driven shaft with either of said elements of the low-speed and reverse gears.

12. The combination of a driving-shaft having a tubular part with an internal key, a driving-shaft slidable in the tubular part of the drive-shaft and having two keys, and three variable-transmission-gear elements in axial alinement surrounding the driven shaft and having internal keys coacting with the keys of said shaft.

13. The combination of a driving-shaft having a tubular portion with an internal key, a driven shaft slidable in the driving-shaft and having two keys, one of which is adapted to engage the key of the driving-shaft to connect the two shafts, a gear on the driving-shaft, a gear loosely surrounding the driven shaft, connected gears meshed with the two first-named gears, a bevel-gear in connection with the second-named gear, an intermediate bevel-gear meshed with the first bevel-gear, and a third bevel-gear meshed with the intermediate bevel-gear and loosely surrounding the driven shaft, said second gear and the third bevel-gear having internal keys adapted to be engaged by the second key of the driven shaft.

14. The combination of a gear-box, a drive-shaft having a tubular portion extending into one end of the gear-box, a gear carried by the drive-shaft within the box, the tubular portion of the drive-shaft also having an internal key, a bearing within the gear-box to which the end of the driven shaft is fitted, a driven shaft extending through the gear-box and having one end slidable in the tubular part of the drive-shaft, a second gear loosely surrounding the driven shaft, a second bearing, the second bearing being located between the two bearings and having its hub ends respectively mounted therein, a third bearing, a sleeve having its ends mounted respectively in the second and third bearings, a third gear attached to the sleeve, a bevel-gear also attached to the sleeve, three connected gears respectively meshed with the first three gears, an intermediate bevel-gear meshed with the first-named bevel-gear, a third bevel-gear mounted in the third bearing and meshed with the intermediate bevel-gear, the second gear, said sleeve and the third bevel-gear having internal keys, and the driven shaft having keys adapted to coact with the keys of the drive-shaft, gears and sleeve for the purpose specified.

15. A sectional gear-case, and a bearing-frame having a part fastened between the sections of the case.

16. A sectional gear-case, and a flanged bearing-frame, the flange of which is engaged between the sections of the case.

17. A sectional gear-case, and two bearing-frames clamped between the sections of the case.

18. A gear-case formed of an intermediate and two end sections, and two bearing-frames having parts clamped between the intermediate and said end case-sections.

19. A sectional gear-case, a bearing-frame having a wall fitting snugly against the inner wall of the gear-case, and a flange fastened between the sections of the case.

In testimony whereof I have signed my name to this specification in the presence of two subscribing witnesses.

JOHN CHALMERS.

Witnesses:
EUGENE R. SPEAR,
WM. T. HALL, Jr.